BAKER, HOLMES & KING.
Cream Strainer.
No. 57,452.           Patented Aug. 21, 1866.
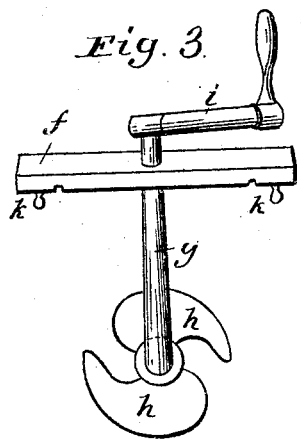
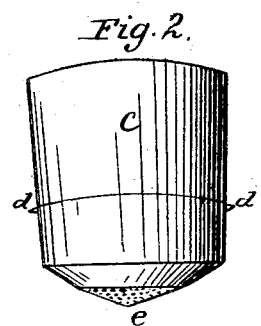
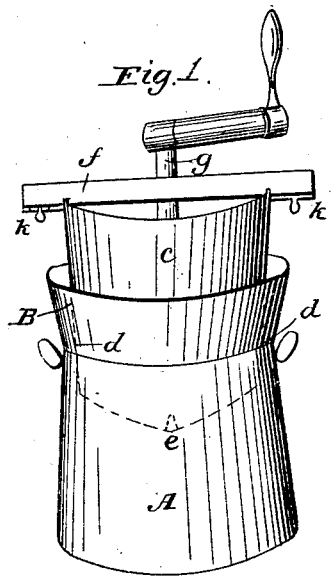

UNITED STATES PATENT OFFICE.

H. BAKER, G. F. HOLMES, AND R. D. KING, OF CORTLAND, NEW YORK.

IMPROVEMENT IN MACHINES FOR STRAINING CREAM.

Specification forming part of Letters Patent No. 57,452, dated August 21, 1866.

*To all whom it may concern:*

Be it known that we, HORACE BAKER, GEORGE F. HOLMES, and RICHARD D. KING, of Cortland, in the county of Cortland and State of New York, have invented a new and useful Machine for Straining Cream and to facilitate the labor of churning, also breaking up the dried cream, called "white caps," which is commonly thrown away in the buttermilk; and we do hereby declare that the following is a full and exact description of the construction and operation of the same, reference being had to the accompanying drawings, and to the letters of reference marked thereon.

Figure 1 is a perspective view of the manner and position in which it is used. Fig. 2 is the strainer through which the cream is forced. Fig. 3 is the crank and rubbers which force the cream through the strainer.

To enable others to make and use our invention, we will proceed to describe its construction and operation.

Letter A represents the churn. Letter B is to represent the curb of the churn. C represents the body of the strainer. $d\ d$ in Figs. 1 and 2 represent a flange on the body of the strainer to support the strainer in the curb of the churn while in use.

Letter $e$ in Figs. 1 and 2 represents a cone-shaped strainer, through which the cream is forced by means of the scroll-wings $h\ h$ and the crank $i$, as represented in Fig. 3.

Letter $f$ in Figs. 1 and 3 represents a bar across the top of the strainer-body to support the upper end of the shaft $g$. The lower end of the shaft $g$ is kept in its proper position by means of a pivot soldered on the center of the cone-strainer inside at the point marked $e$. The bar $f$ is held in its position by means of two slides, K K, as seen in Figs. 1 and 3. The flange $d\ d$ on strainer-body is made to fit all-sized churns.

The scroll-wings $h\ h$ are made to fit the cone-strainer, and cut out in front, so as to conduct the cream to the center and force it through by turning the crank.

The process of using the machine is to prepare the churn for the cream; then put the strainer on in the place of the cover, the flange resting on the shoulder inside the curb of the churn; then pour the cream in the strainer; put in the scroll wings or paddles, and fasten with the two slides; turn the crank, and the work is soon done, thus saving the washing of extra pails or dishes, and equalizing the cream, which saves time in churning.

What we claim as our invention, and desire to secure by Letters Patent in the process of straining cream, is—

1. The flange for sustaining the strainer on any given-sized churn.
2. The cone-shaped strainer and center pivot, in combination with the scroll-rubbers, substantially as set forth.
3. The scroll-rubbers, in combination with the shaft, crank, cross-bar, and fastenings, as herein described, and for the purpose set forth.

HORACE BAKER.
    GEO. F. HOLMES.
    RICHARD D. KING.

Witnesses:
 S. R. HUNTER,
 S. N. KINNEY.